No. 876,696. PATENTED JAN. 14, 1908.
C. J. DAUNER & C. A. WERRMANN.
JEWELER'S GAGE.
APPLICATION FILED MAY 22, 1907.

2 SHEETS—SHEET 1.

Witnesses
W. N. Woodson
A. T. Measer

Inventors
C. J. Dauner
C. A. Werrmann

By R. A. P. Lacey,
Attorneys

THE NORRIS PETERS CO., WASHINGTON, D. C.

No. 876,696. PATENTED JAN. 14, 1908.
C. J. DAUNER & C. A. WERRMANN.
JEWELER'S GAGE.
APPLICATION FILED MAY 22, 1907.
2 SHEETS—SHEET 2.
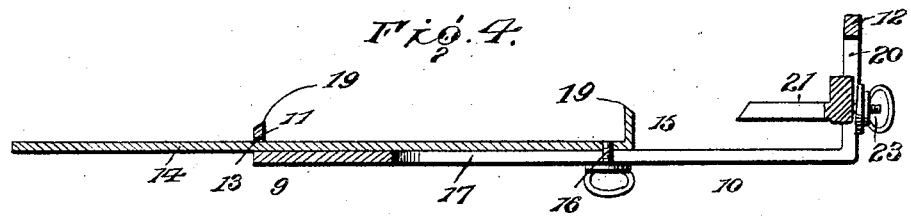
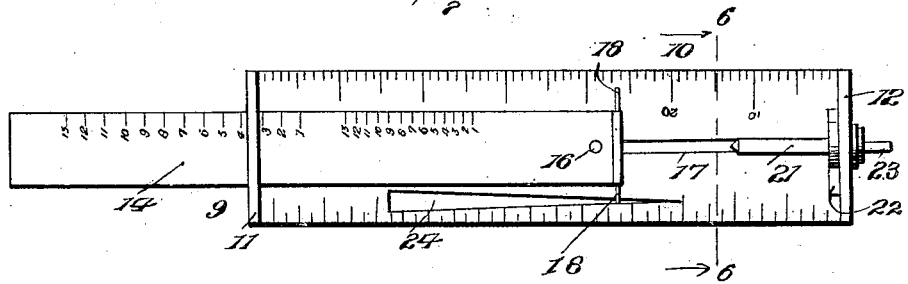
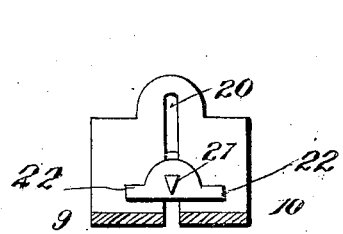
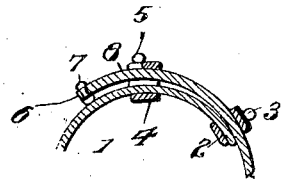
Witnesses
W. N. Woodson
A. T. Measer
Inventors
C. J. Dauner
C. A. Werrmann
By R. & A. B. Lacey,
Attorneys

UNITED STATES PATENT OFFICE.

CHARLES J. DAUNER AND CARL A. WERRMANN, OF CINCINNATI, OHIO.

JEWELER'S GAGE.

No. 876,696.　　　Specification of Letters Patent.　　　Patented Jan. 14, 1908.

Application filed May 22, 1907. Serial No. 375,059.

*To all whom it may concern:*

Be it known that we, CHARLES J. DAUNER and CARL A. WERRMANN, citizens of the United States, residing at Cincinnati, in the county of Hamilton and State of Ohio, have invented certain new and useful Improvements in Jewelers' Gages, of which the following is a specification.

This invention contemplates certain new and useful improvements in jewelers' implements, and the invention has for its object an improved gage or slide rule for the use of jewelers in manufacturing rings according to the size of a person's finger, the invention being designed to do away entirely with the ordinary ring gages or mandrel, as well as the sets of different ring sizes that are usually employed.

With this and other objects in view as will more fully appear as the description proceeds, the invention consists in certain constructions and arrangements of the parts that we shall hereinafter fully describe and then point out the novel features in the appended claims.

Figure 1:
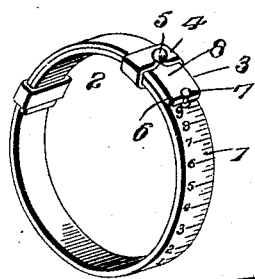
Figure 8:
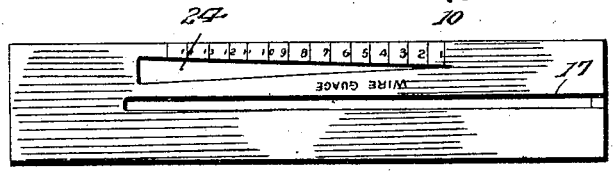
Figure 2:
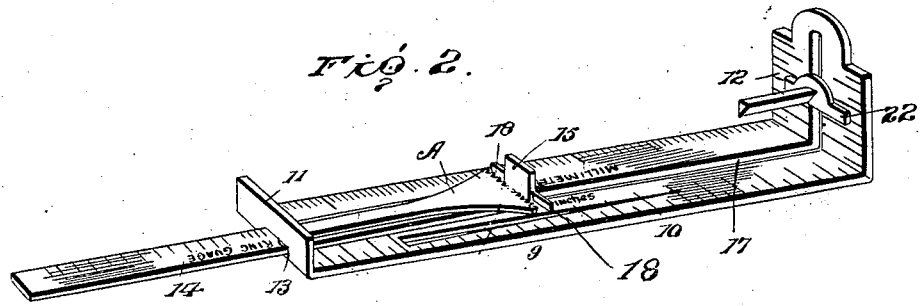
Figure 3:
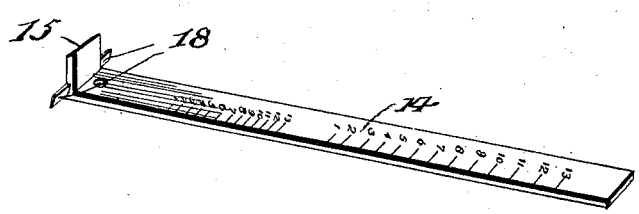

For a full understanding of the invention and the merits thereof and also to acquire a knowledge of the details of construction and the means for effecting the result, reference is to be had to the following description and accompanying drawings, in which:

Figure 1 is a detail perspective view of a ring employed in connection with our invention. Fig. 2 is a perspective view of our improved slide rule for jewelers' use. Fig. 3 is a detail perspective view of the slide of said rule. Fig. 4 is a longitudinal sectional view of the rule. Fig. 5 is a top plan view thereof. Fig. 6 is a transverse sectional view of the rule on the line 6—6 of Fig. 5. Fig. 7 is a fragmentary sectional view of the ring illustrated in Fig. 1. Fig. 8 is a rear face view of the base plate.

Corresponding and like parts are referred to in the following description and indicated in all the views of the drawings by the same reference characters.

In practicing our invention, we employ a finger band 1, which is preferably of German silver or steel which is not especially subject to expansion and contraction by changes in temperature. The ends of this band 1 overlap, as shown, and to one end a yoke 2 is secured and embraces the overlapping portion of the other end. This yoke is preferably formed on its outer side with a knob 3, to assist in expanding or contracting the band. A sliding loop 4 embraces the overlapping ends of the band 1, said loop being provided with a finger knob 5 and with a recess 6 adapted to receive the knob 7 of one end of the band, when the loop is slid over into binding relation with the two overlapping ends.

One end of the band is thickened towards its extremity as indicated at 8. Hence it will be seen that as the slide loop is moved over towards said thickened end, after the band has been expanded or contracted to the desired extent around a persons finger, the band will be securely held in its adjusted condition, indicating the size of ring which the person takes. For this purpose, the band is provided with a series of graduations, as shown, said graduations indicating the standard ring sizes. After the size has been determined, the slide rule 9 of our invention is employed, instead of the ordinary ring gages or mandrels. Our rule 9 comprises a base plate 10 which is formed with laterally bent ends 11 and 12. The end 11 is formed with a transversely extending slot 13 parallel with one face of the base plate 10, and a slide 14 is mounted to move in the slot 13. This slide is provided at one end with an annularly disposed extremity 15, and a set screw 16 is secured to the slide at its end and works within a longitudinal slot 17 in the base plate 10. The angularly disposed extremity 15 of the slide 14 is provided at both sides with a laterally extending lug 18 designed to serve as pointers in connection with the two sets of graduations shown on the face of the base plate 10. One set of these graduations indicates inches and fractions thereof, and the other set millimeters, it being well known that this method of measuring is now employed by all practical jewelers when ordering any work to be done.

The slide 14 contains the legend "standard ring gage" and also contains two sets of ring sizes, said sizes ranging in the present instance from one to thirteen. After the size of a finger has been determined by the use of the band 1, the slide is adjusted on the base plate until the graduation corresponding to said size appears at the inner side of the laterally bent end 11, and the slide is then held by the set screw 16 in this adjusted position. Set rings, as is well known, are made in two parts, one of such parts being designated A in the drawings. From a set of these parts of different sizes, the proper size is found to fit between the end 11 of the base plate and the angularly disposed extremity 15 of the slide 14, thereby determining the size of the parts to be selected in the manufacture of the ring. The said bent end 11 and angularly exposed extremity 15 are preferably beveled as shown at 19.

The laterally bent end 12 of the base plate is provided with a longitudinal slot 20 in which a gage 21 is mounted to slide, said gage being adapted for use in determining the size of setting to be employed, it being noted that the inner side of this laterally bent end 12 contains graduations, and that the gage 21 is provided with oppositely extending lugs 22 or pointers coöperating with the said graduations. This gage is in the form of a bar projecting inwardly from the end 12 of the base plate and it is held at different adjustments in the slot of said end by means of set screw 23.

24 designates a tapering slot or wire gage, the graduations for said slot being preferably located on the outer or rear side of the base plate, so as not to interfere with the graduations on the opposite side of said plate. Fig. 8 shows the rear face view of the base plate with the wire gage graduations thereon.

As before stated, the slide 14 contains two sets of ring sizes. One of these sets is used when the rings are in one piece of metal with no setting, and the other is for those cases where the parts of metal are used when a ring is to be manufactured with a setting in it.

For the purpose of determining the proper height or thickness of the box where a set or stone of the ring is to fit, the setting selected is laid flat on the base plate and the gage 21 is laid down upon it, the oppositely extending lugs 22 constituting pointers which coöperate with the graduations on the laterally bent ends 12.

Having thus described the invention, what is claimed as new is:

1. A gage of the character described, comprising a base plate provided with laterally bent ends, one of said ends being formed with a slot parallel with the face of the base plate, a slide mounted to work through said slot and provided at one end with an angularly disposed extremity adapted to co-act with the said slotted end of the base plate, the said slide containing graduations indicating standard ring sizes, the base plate being formed with a longitudinal slot, and a set screw working in said slot and secured to the slide.

2. A gage of the character described, comprising a base plate provided with laterally bent ends, one of said ends being formed with a slot parallel with the face of the base plate, a slide mounted to work through said slot and provided at one end with an angularly disposed extremity adapted to co-act with the said slotted end of the base plate, the said slide containing graduations indicating standard ring sizes, the base plate being formed with a longitudinal slot, and a set screw working in said slot and secured to the slide, the base plate being provided on opposite sides of said longitudinal slot with graduations of millimeters and inches and fractions thereof, respectively, and the slide being formed at its laterally exposed extremity with oppositely projecting lugs serving as pointers for the various graduations.

3. A gage of the character described, comprising a base plate and a slide adjustably mounted thereon, said base plate being provided with a laterally bent end formed with a longitudinal slot and graduations at the sides of said slot, a gage for settings adjustably mounted in said slot and provided with oppositely extending lugs adapted to co-act with the graduations of the said end, and a set screw adapted to hold said setting gage at different adjustments with the slot.

In testimony whereof we affix our signatures in presence of two witnesses.

CHARLES J. DAUNER. [L. S.]
CARL A. WERRMANN. [L. S.]

Witnesses:
R. O. NEWCOMB,
A. M. HARVNOB.